United States Patent [19]
Allen

[11] Patent Number: 5,046,707
[45] Date of Patent: Sep. 10, 1991

[54] SPHERICAL POSITIONING PIN

[75] Inventor: Calvin G. Allen, Memphis, Tenn.

[73] Assignee: The United States of America as represented by the Secretary of the Air Force, Washington, D.C.

[21] Appl. No.: 278,110

[22] Filed: Nov. 30, 1988

[51] Int. Cl.$^5$ .............................................. B23Q 1/06
[52] U.S. Cl. ................................................... 269/309
[58] Field of Search .............. 29/464, 465, 559, 563, 29/33 P; 269/309, 310, 56, 296; 33/180 R; 198/345

[56] References Cited

U.S. PATENT DOCUMENTS

| | | |
|---|---|---|
| 3,392,253 | 7/1968 | Adams et al. |
| 3,713,944 | 1/1973 | Dennis et al. |
| 4,058,890 | 11/1977 | Pierce et al. |
| 4,586,702 | 5/1986 | Chambers ............................ 269/310 |
| 4,610,020 | 9/1986 | La Fiandra ........................... 269/309 |
| 4,699,364 | 10/1987 | Birjvkov et al. ..................... 269/309 |
| 4,934,680 | 6/1990 | Schneider ............................ 269/309 |

Primary Examiner—Robert C. Watson
Attorney, Agent, or Firm—William G. Auton; Donald J. Singer

[57] ABSTRACT

The datum line establishing tool provides an improved method for deriving an accurate datum line on Printed Circuit Boards (PCB) and other similar assemblies without the need for having close tolerance PCB index holes and base tool pins. The datum line establishing tool includes a tool base and a spherical pin assembly (consisting of a sphere attached to a pin base); and a cylindrical section pin assembly (consisting of a cylindrical section to a second pin base); and a compression spring assembly. The two pin assemblies are inserted into their respective tool base cavities and are held in place with an upward bias by the compression spring assembly against the cavity flange. An improved method is disclosed by deriving an accurate datum-line on printed circuit boards (PCB) without the need for having close tolerance index holes and corresponding index pins. The process comprises the steps of placing the index holes of a PCB over two pin assemblies. One of the pin assemblies is a sphere design and maintains the PCB accurately and firmly in the "Y" plane. The other pin assembly is non-spherical in design and it maintains the PCB in the "X" plane. Once the PCB is stationed over the index holes it is clamped into place.

6 Claims, 2 Drawing Sheets

SPHERICAL POSITIONING PIN

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to alignment fixtures and jigs for precisely positioning printed circuit board (PCB) workpiece during a manufacturing operation, and more specifically to fixtures and jigs having a pair of locating pins for insertion in a pair of holes in the workpiece.

During manufacture of a workpiece, it often is necessary to precisely position the workpiece in an alignment fixture or jig. The location of the workpiece in the fixture defines a frame of reference for establishing the location at which various machining or other manufacturing operations are to be performed.

In order to layout a hole pattern on a printed circuit board (PCB) or other similar assemblies an accurate datum line is required. The datum line is used as a reference point from where all other dimensions are referenced. Currently, a datum line is established by drilling two close tolerance pins located on a base plate. Because of the tolerances required the establishment of a datum line is both difficult and costly.

The task of providing an alternative to the practice of using an accurate datum line with a tight tolerance, is all alleviated to some extent by the system disclosed in the following U.S. patents, the disclosures of which specifically incorporates by reference:

U.S. Pat. No. 3,392,253 issued to Adams;
U.S. Pat. No. 3,713,944 issued to Dennis; and
U.S. Pat. No. 4,058,890 issued to Pierce.

All of the above-cited references are examples of prior art. Additionally, some conventional fixture designs are described in the "Tool Engineers Handbook", F. W. Wilson, editor, 1959.

One of the most basic fixture designs comprises the use of two cylindrical pins which are intended to be inserted in two corresponding circular holes, shown as locating holes, in the workpiece. A shortcoming of this design is (as described above) that the two locating hole must be manufactured with extreme accuracy in their diameters and in the spacing between them. If, due to manufacturing variations, the spacing between the two locating holes is slightly off or the diameter of one of the two holes is slightly smaller than that of its corresponding pin, it will be difficult or impossible to push the pins through the holes, thereby preventing the workpiece from being mounted on the fixture. On the other hand, if the diameter of one of the holes is significantly larger than that of its corresponding pin, the workpiece will be able to slip relative to the pin and will not be precisely located on the fixture.

A known alternative to the foregoing fixture design using two cylindrical pins is to use one cylindrical pin and one "diamond" pin. In the "Tool Engineers Handbook" cited above, this design is illustrated in FIGS. 91-5 and 91-9 and is discussed in the third paragraph on page 91-8 and in the text beginning with the last paragraph on Page 91-9. The diamond pin is shaped so as to contact its corresponding locating hole only at two small accurate contact surfaces located at either end of a diameter of the diamond pin, the diameter being perpendicular to a line drawn between the two pins. The diamond pin shape provides clearance around the pin for escape of unwanted chips and dirt, and the shape also eases insertion and removal of the pin when the spacing between the two holes is very slightly off.

However, the fixture using the diamond pin does not overcome the shortcoming of the previously discussed fixture in accommodating variations in the spacing between, and the diameters of the two locating holes in the workpiece. Both fixture designs prevent insertion of the locating pins if either of the locating holes is too small or if the spacing between the holes is significantly off, and both designs allow slippage of the workpiece if either of the locating holes is too big.

Another type of conventional fixture overcomes some of the problems of the foregoing designs by using a spring-loaded conical locating pin. This type of fixture is disclosed in FIG. 91-11 of the cited "Tool Engineers Handbook" and in the text referring to that figure at pages 91-10 and 91-13. Such a fixture accurately centers a locating hole of the workpiece about the pin, independent of variations in the hole diameter, because the spring pushes the conical pin into the hole to the depth at which the diameter of the pin equals that of the hole.

Although conventional fixtures have used a spring-loaded conical pin to accommodate variations in the diameter of a locating hole in a workpiece, no known fixture accommodates substantial variations in the spacing between two locating holes. For example, suppose a fixture has two spring-loaded conical pins designed to be inserted in two locating holes in a workpiece. If the spacing between the holes is inaccurate, the two holes cannot both be centered over their corresponding pins, and there will be no uniquely determined alignment of the workpiece on the fixture. For this reason, spring-loaded conical pins are usually used singly to center a workpiece, but not in pairs to precisely locate a workpiece in two or three dimensions.

SUMMARY OF THE INVENTION

The present invention is a fixture of jig for precisely and repeatably positioning a workpiece relative to two locating holes in the workpiece, even if the diameters of, and spacing between, the two holes is not accurately controlled. More specifically, the fixture or jig according to the present invention comprises first and second spring-loaded tapered pins, the first pin having a circular transverse cross-section and second pin being a cylindrical pin having an elongated transverse cross-section, the second pin being elongated along an axis perpendicular to a line drawn between the two pins.

In operation the index holes in a PCB are laid over the two pin assemblies. Because of the sphere design of the first pin assembly, the PCB is maintained firmly and accurately in the "X" plane. By having the second pin assembly configured non-spherically in the "Y" direction the tolerances or the PCB index holes do not have to be closely controlled. Once the PCB is stationed over the index holes it is held in place by clamps.

It is an object of the present invention to provide a datum line establishing tool for the manufacture of printed circuit boards, and similar workpieces.

It is another object of the present invention to provide a method for deriving an accurate datum line on printed circuit boards without a need for close tolerance index holes and corresponding index pins.

These objects together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENTS

Figure 1:
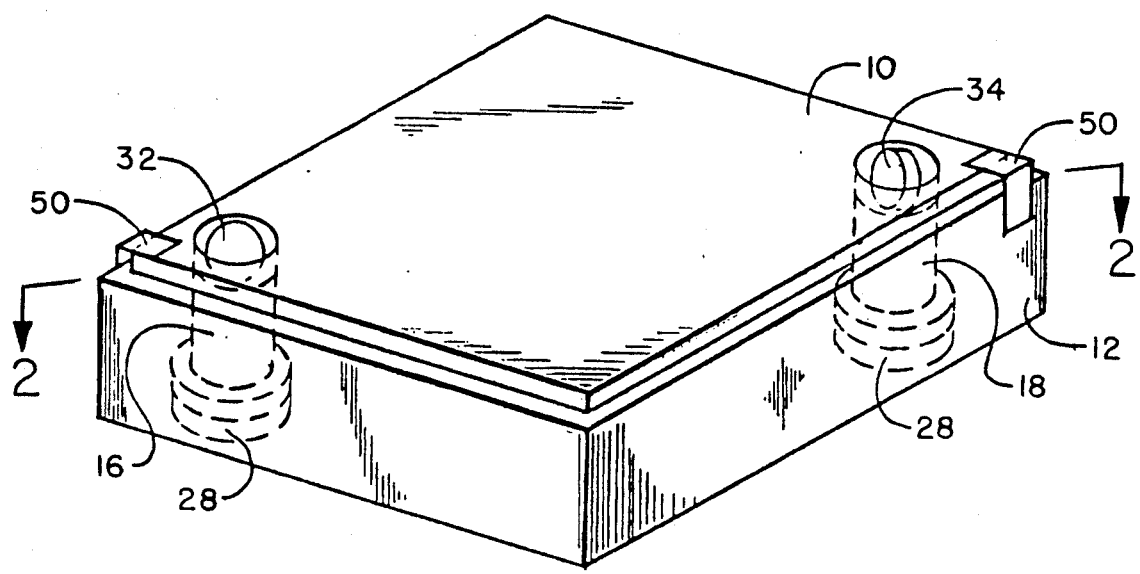
FIG. 1 is a perspective view of a fixture according to the present invention, with the visually hidden features shown in phantom.
Figure 2:
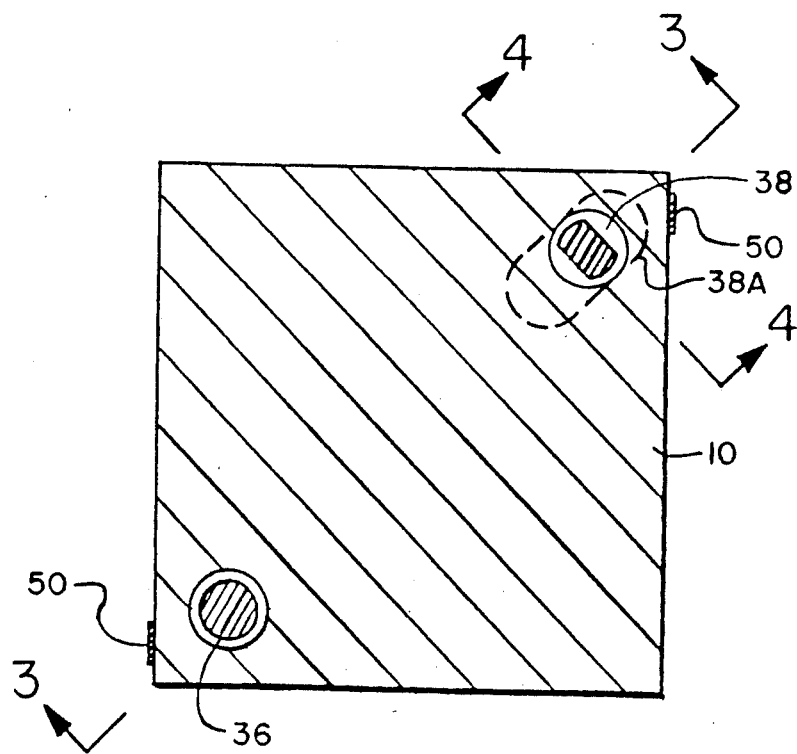
FIG. 2 is a transverse sectional view of a workpiece mounted on the fixture of FIG. 1.
Figure 3:
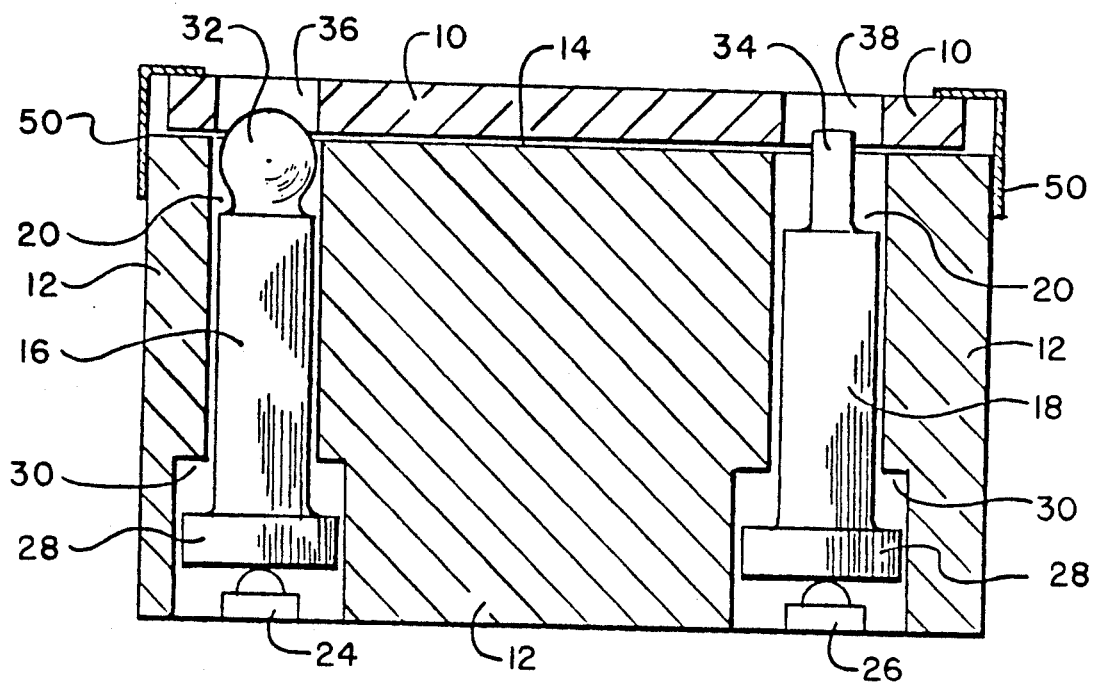
FIG. 3 is a sectional view of the workpiece and fixture of FIG. 2 taken along a line drawn between the two locating pins of the fixture. This view includes a longitudinal sectional view of each of the two locating pins.
Figure 4:
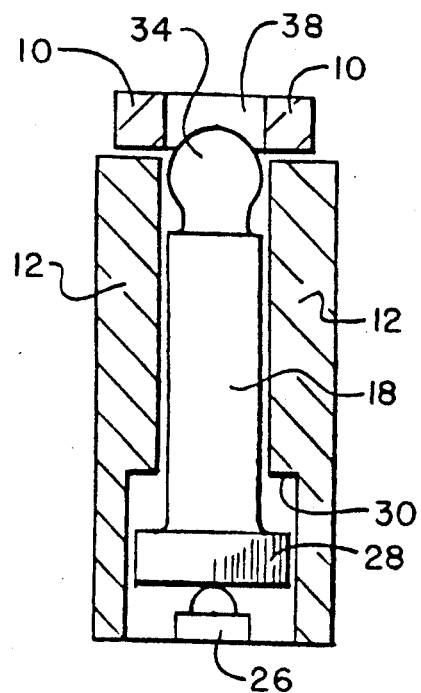
FIG. 4 is a sectional view of the workpiece and fixture of FIG. 2 taken along a line drawn through the non-spherical locating pin in a direction perpendicular to the section line of FIG. 3.

FIGS. 1-4 show the preferred embodiment of an alignment fixture according to the present invention. The preferred embodiment is shown in FIGS. 2-4 together with an electronic circuit board 10 which is being aligned by the fixture. However, the fixture of the present invention may be used more broadly to align any type of workpiece in which a pair of locating or reference holes have been formed.

The reader's attention is directed specifically to both FIG. 1 and FIG. 2. The invention is used as follows. First the printed circuit board 10 is placed over the datum line establishing tool, and manipulated until its first reference hole 38 settles over the cylindrical tip 34 of the cylindrical pin assembly. Note that the cylindrical tip has: a length which approximately equals the diameter of the first reference hole 38; and a width which is smaller than the reference hole. The length of the cylindrical tip 34 is perpendicular to the line between the two pin assemblies so that the workpiece is fixed and can't move along an X vector (parallel with the length of the cylindrical tip); but the workpiece can move along a Y vector (along an imaginary line between the two pin assemblies). The small width of the cylindrical tip 34 allows the workpiece to be manipulated or wiggled back and forth along this Y vector until the second reference hole 36 settles over the spherical tip 32 of the spherical pin assembly. The diameter of this second reference hole settles over the spherical tip, the workpiece is fixed along the Y vector as well as the X vector.

Other variations of the invention are possible. For example, if the first reference hole 38 in the workpiece is cylindrical rather than round, the cylindrical tip 34 may slide up and down the cylindrical reference hole (allowing the workpiece to move along a Y vector, parallel with the length of the cylindrical hole) while fixing the workpiece along the X vector (which is perpendicular to the length of the cylindrical hole 38A). The dashed line 38A around the contour of the first reference hole is an example of the use of a cylindrical reference hole 38A in a workpiece, with a cylindrical tip 34. With the cylindrical reference hole 38A, the cylindrical tip has contact with the sides of the walls that prevents movement along the X vector (given by 3) but allows substantial movement along the X vector (given by 4).

The alignment fixture includes a base 12 having a horizontal planar upper surface which functions as a reference plane on which the workpiece 10 is positioned. The fixture further includes two pin assemblies 16 and 18 mounted in the base 12 within vertical cylindrical cavities 20, so as to allow the pins to slide longitudinally, i.e., vertically. In general, the diameters of the two pins may be different, although the two diameters are the same in the illustrated embodiment. For maximum precision in aligning the workpiece 10, the diameters of pins 16 and 18 and cavities 20 should be extremely accurate to minimize horizontal motion of the pins with the cavities.

Compression springs 24 and 26 push upward against the lower end of pins 16 and 18, respectively, and provide a restoring force to the pins when a workpiece 10 pushed the pins downward. To limit the upward travel of the pins in response to the springs, each pin 16 or 18 preferably has a flange 28 which abuts against a ledge or stop 30 in the cavity 20.

The upper end of each pin 16 and 18 has a tip 32 and 34, respectively, which partially extends above the upper surface 14 of the fixture base 12. The two tips have different shapes, these shapes being a distinctive feature of the invention to be described more fully below. However, a characteristic shared by the two tips is that they are each tapered; specifically, each tip 32 or 34 has a transverse width or diameter which progressively decreases from a predetermined maximum value at one longitudinal position A or B, respectively, to a minimum value (zero, in the illustrated preferred embodiment) at the end of the tip.

A pair of circular holes 36 and 38, referred to as locating or reference holes, must be formed in the workpiece 10 which is to be mounted on the fixture. The spacing between the two locating holes 36 and 38 must approximately equal the spacing between the two pins 16 and 18 on the fixture. The diameter of each locating hole 36 or 38 must be between the minimum and maximum transverse width of the tip 32 or 34 or the corresponding pin 16 or 18. These dimensions need not be very accurate because the present invention has the advantage of being able to precisely align a workpiece in spite of moderate inaccuracies in the size and placement of the locating holes.

The first pin assembly 16 is the spherical pin assembly. In other words the tip 32 of the assembly is a sphere which is mounted upon its pin base 16.

The second pin assembly 18 may be termed a "cylindrical pin assembly", because it has a tip 34 with an elongated transverse cross-section mounted upon its pin base 18. As indicated in FIGS. 2 and 3, the tip of the cylindrical pin assembly has an elongated transverse cross-section with a length that is perpendicular to an imaginary line drawn between the spherical pin assembly 28 and the cylindrical pin assembly. As illustrated in FIG. 2, the direction of the arrows numbered "3" is vector "X", and the direction of arrows "4" is vector "Y".

The advantage of the design is as follows. As mentioned above, the prior art systems required extreme accuracy and precision in the machining of locating holes and corresponding pins. In the present invention, the elongated shape of the cylindrical tip 34 allows the workpiece to move back and forth along the Y vector when the index hole is settled over the cylindrical tip. In other words, the entire workpiece can adjustably move until the first index hole settles over the spherical tip 32 of the spherical pin assembly 28, after which the clamps 50 hold the circuit board 10 to the base 12.

This adjustable motion eliminates the tolerance requirements of prior art workpiece fabrication systems, which has proven difficult and costly. Although the invention was designed to facilitate printed circuit board fabrication, it is applicable to a variety of different workpiece fabrication systems.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A datum line establishing tool for fixing a workpiece in an X plane and a Y plane, said X and Y planes being perpendicular to each other, said workpiece having a planar surface having first and second index holes disposed in opposite corners, said datum line establishing tool comprises:
    a tool base which has a first and a second tool base cavity disposed in opposite corners;
    a spherical pin assembly mounted in said first tool base cavity in said tool base, and which projects upwards through said first index hole in said planar surface of said workpiece, said spherical pin assembly thereby maintaining said workpiece in said X plane;
    a cylindrical pin assembly mounted in said second tool base cavity in said tool base, and which projects upwards through said second index hole in said planar surface of said workpiece, said cylindrical pin assembly having an elongated transverse cross-section which is elongated along an axis which is perpendicular to a line which runs between said spherical pin assembly and said cylindrical pin assembly, said cylindrical pin assembly thereby maintaining said workpiece in said Y plane;
    a means for fixing said workpiece to said data line establishing tool; and
    a means for providing an upward bias to said spherical pin assembly and said cylindrical pin assembly so that they respectively project upwards through said first and second index holes.

2. A datum line establishing tool, as defined in claim 1, wherein said means for providing an upward bias comprises first and second compression springs, which are respectively mounted in said first and said second tool base cavity in said tool base, and wherein said spherical pin assembly comprises:
    a first pin base which is mounted in said first tool cavity above said first compression spring; and
    a spherical tip which is fixed upon said first pin base so that it projects through said first index hole of said workpiece, said spherical tip having a diameter which approximately equals said first index hole's diameter.

3. A datum line establishing tool, for fixing a workpiece in an X plane and Y plane, said X and Y planes being perpendicular to each other, said workpiece having a planar surface having first and second index holes disposed in opposite corners, said datum line establishing tool comprises:
    a tool base which has a first and a second tool base cavity disposed in opposite corners;
    a spherical pin assembly mounted in said second tool base cavity in said tool base, and which projects upwards through said second index hole in said planar surface of said workpiece, said spherical pin assembly thereby maintaining said workpiece in said X plane;
    a first pin base which is mounted in said second tool cavity above a first compression spring; and
    a cylindrical tip which is fixed upon said first pin base so that it projects through said first index hole of said workpiece, said cylindrical tip having a width smaller than said first index hole's diameter which allows said first index hole to adjustable move until said second index hole settles over said spherical pin assembly, said cylindrical tip having a length which approximately equals the diameter of the first index hole of said workpiece, said length of said cylindrical tip being perpendicular to an imaginary line between said first and second pin base, said cylindrical tip thereby restricting movement of said workpiece along said X plane by allowing movement along said Y plane until said second index hole settles over said spherical pin assembly.

4. A datum line establishing tool, as defined in claim 3, wherein said first index hole of said workpiece is a cylindrical hole which has a cylindrical hole width which approximately equals the length of said cylindrical tip, said cylindrical hole having a cylindrical hole length which is greater than the length of the cylindrical tip, said cylindrical hole length being parallel with said Y plane and allowing movement of said workpiece along said Y plane while restricting movement along said X plane when said cylindrical tip is inserted in said cylindrical hole.

5. A datum line establishing tool, as defined in claim 3, wherein said spherical pin assembly comprises:
    a second pin base which is mounted in said second tool cavity above a second compression spring; and
    a spherical tip which is fixed upon said second pin base so that it projects through said second index hole of said workpiece, said spherical tip having a diameter which approximately equals said second index hole's diameter.

6. A datum line establishing tool for fixing a workpiece in an X plane and a Y plane, said X and Y planes being perpendicular to each other, said workpiece having a planar surface having first and second index holes disposed in opposite corners, such that said first index hole is a circular hole and said second index hole being a cylindrical hole with an eliptical surface plane which has an elongated length which is perpendicular to an imaginary line connecting the first and second index holes, wherein said datum line establishing too comprises:
    a tool base which has a first and second tool base cavity disposed in opposite corners;
    a first pin base which is mounted in said first tool base cavity above a first compression spring;
    a spherical tip which is fixed upon said first pin base so that it projects through said first index hole of said workpiece, said spherical tip having a diameter which approximately equals said first index hole's diameter;
    a second pin base which is mounted in said second tool cavity above a second compression spring; and a cylindrical tip which is fixed upon said second pin base so that it projects through said second index hole of said workpiece, said cylindrical tip having a width which approximately equals second index hole's diameter and which allows said second index hole to adjustably move until said first index hole settles over said spherical tip said cylindrical tip having a cylindrical length which is aligned with and smaller elongated than the length of said cylindrical hole so that when said cylindrical tip's length is parallel with said Y plane, it allows movement of said workpiece along said Y plane while restricting movement along said X plane when said cylindrical tip is inserted in said cylindrical hole.

* * * * *